US005155762A

United States Patent [19]

Croquet et al.

[11] Patent Number: 5,155,762

[45] Date of Patent: Oct. 13, 1992

[54] METHOD AND A SYSTEM FOR ACQUIRING AND TRANSMITTING INFORMATION ABOUT TV PROGRAM AUDIENCES

[75] Inventors: Jean-Louis Croquet; Jean-Pierre Bidon, both of Versailles; Jean-Marc Drevon, Venelles; Pierre-Yves J. Duval, Aix en Provence, all of France

[73] Assignee: Croquet & Cie, Viroflay, France

[21] Appl. No.: 439,399

[22] PCT Filed: Mar. 13, 1989

[86] PCT No.: PCT/FR89/00102

§ 371 Date: Jan. 17, 1990

§ 102(e) Date: Jan. 17, 1990

[87] PCT Pub. No.: WO89/08956

PCT Pub. Date: Sep. 21, 1989

[30] Foreign Application Priority Data

Mar. 14, 1988 [FR] France ................................ 88 03297

[51] Int. Cl.[5] ........................ H04M 11/00; H04N 7/02

[52] U.S. Cl. ........................................ 379/92; 358/84

[58] Field of Search ................. 379/92, 104, 105, 201; 358/84

[56] References Cited

U.S. PATENT DOCUMENTS 4,493,948 1/1985 Sues et al. .
4,495,596 1/1985 Sciulli ................................ 379/107
4,546,382 10/1985 McKenna et al. .................... 379/92
4,566,030 1/1986 Nickerson et al. .................. 379/92
4,578,700 3/1986 Roberts et al. ...................... 379/92
4,646,145 2/1987 Percy et al. .......................... 379/92
4,757,267 7/1988 Riskin ................................ 379/201
4,763,191 8/1988 Gordon et al. ..................... 379/201
4,779,198 10/1988 Lurie .................................. 358/84
4,907,255 3/1990 Kurokawa .......................... 379/100
4,912,552 3/1990 Allison, III et al. ................. 379/92

FOREIGN PATENT DOCUMENTS 128481 12/1984 European Pat. Off. .
2120024 8/1972 France .
2259396 8/1975 France .
2283614 3/1976 France .
2602624 2/1988 France .
2143354 2/1985 United Kingdom .

OTHER PUBLICATIONS

PCT application, Pub. No. WO88/01117, Watanabe, Feb. 1988.

*Primary Examiner*—James L. Dwyer
*Assistant Examiner*—Wing F. Chan
*Attorney, Agent, or Firm*—Bell, Seltzer, Park & Gibson

[57] ABSTRACT

The invention relates to acquiring information about television program audiences and transmitting it in real time by means of detection apparatuses (10) associated with telephone sets (12) and connected via the switched telephone network (12) and the TRANSPAC network (28) to a central unit for collecting and processing the information transmitted in real time by the apparatuses (10).

4 Claims, 1 Drawing Sheet

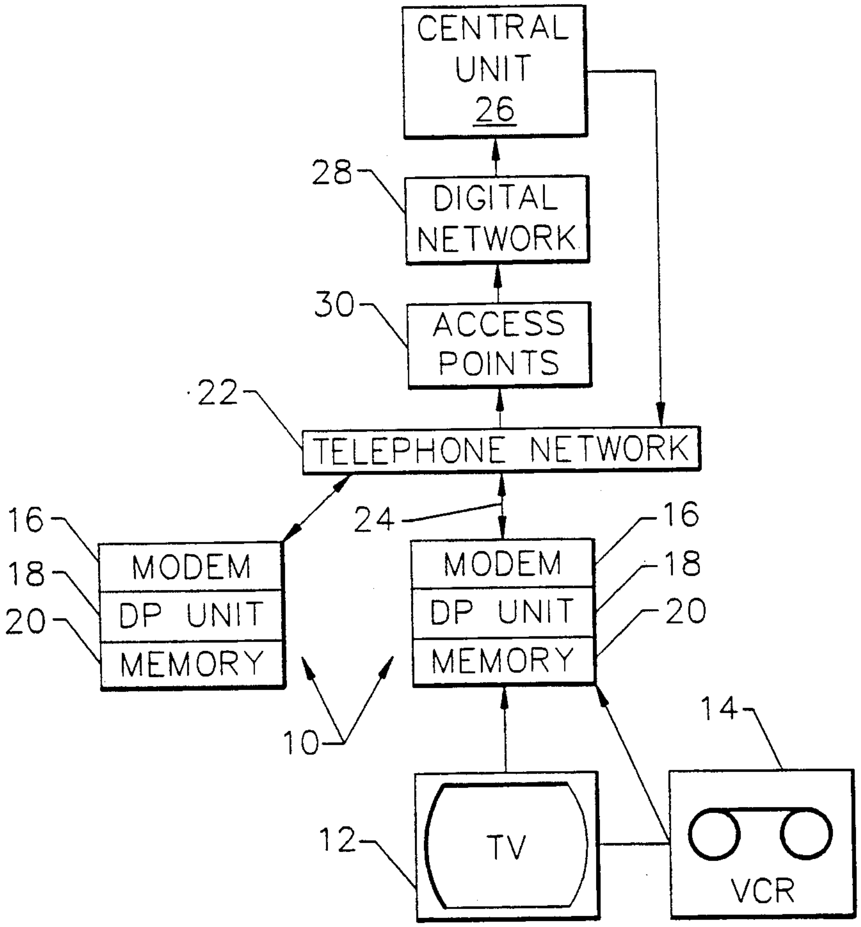
CENTRAL
UNIT
26
28
DIGITAL
NETWORK
30
ACCESS
POINTS
22
TELEPHONE NETWORK
16
18
20
MODEM
DP UNIT
MEMORY
24
16
18
20
MODEM
DP UNIT
MEMORY
10
14
12
TV
VCR

METHOD AND A SYSTEM FOR ACQUIRING AND TRANSMITTING INFORMATION ABOUT TV PROGRAM AUDIENCES

The invention relates to a method and a system for acquiring and transmitting information about television program audiences.

Audience detection or measurement apparatuses currently exist which are associated with television sets in the homes of viewers which together constitute a representative sample of the population. Each audience detection or measurement apparatus includes an internal clock, means for detecting when the television set is switched on and off, and means for identifying the selected channel.

By associating the selected channel with the exact time, it is naturally possible to determine which program was visible on the screen.

In current systems, all of this information is recorded in a memory in the audience detection apparatus, and each apparatus is interrogated by an overall central unit at night and via the switched telephone network. On the basis of information provided by a plurality of such apparatuses, a central unit establishes audience ratings which are only moderately accurate since prior apparatuses do not provide information about the number of people looking at a television program, indeed they cannot even guarantee that there were any viewers in front of the television set.

Recent proposals have been made for novel audience detection apparatuses which are specifically capable of determining the number of people present in front of a television set which is switched on, and which also provide information about the periods for which a television set if switched on or off and about the selected channel, thereby enabling relatively accurate audience ratings to be established. However, when the information is stored in a memory in each apparatus and the apparatuses are interrogated in deferred time, e.g. during the night, it is not possible to establish audience ratings immediately. Practice has also shown that there are several problems associated with the central unit interrogating the apparatuses during the night by means of the viewers' telephone lines, for example there may be conflicts of access to the telephone line, the telephone bell may ring in the middle of the night, the telephone line may accidentally be locked up, etc.

The present invention seeks to avoid these drawbacks.

To this end, the present invention provides a method of acquiring and transmitting information about television program audiences, the method consisting in associating detection apparatuses with television sets and/or video recorders in order to obtain information about television program audiences, in recording said information and the precise time thereof in memories of the apparatuses, and in periodically connecting each of the apparatuses to a central unit via the telephone network in order to transfer said information recorded in said apparatuses to said central unit, the method being characterized in that it consists in connecting the central unit to the switched telephone network via a digital network for conveying digital data and having access points in the switched telephone network, in using said digital network and its access points as data concentrators between the detection apparatuses and the central unit, and in periodically, or on instruction from the central unit, connecting all of the detection apparatuses, or at least a large number of them, to the central unit and transmitting the information detected by the apparatuses about the audiences of television programs to the central unit in real time.

By transmitting the information collected by the audience detection apparatuses in real time, it is possible to obtain immediate data for establishing audience ratings. The use of a network such as the national TRANSPAC network and its points of access makes it possible in a manner which is simple and which does not require special investment to obtain a very large quantity of information very quickly from a large number of audience detection apparatuses distributed throughout the territory, thereby making it possible to obtain ratings representative of the audience on a national scale.

The TRANSPAC network is a national network for conveying information in packets, and in France it is run by the Posts and Telecommunications Administration. In conventional manner, this network is used by the TELETEL service to enable people having a video terminal to interrogate one or more data bases firstly by dialing the telephone number of a videotex access point to the TRANSPAC network, and then by keying-in the access code of the desired data base. Videotex access points are terminal concentrators connected by the TRANSPAC network to a data processing system called a "server" which is associated with one or more data bases. The same system is used for establishing connections and it allows information to be interchanged between different terminals.

It will thus be understood that the method of the invention which uses this system for transmitting information concerning television program audiences makes it possible to obtain the data necessary for establishing audience ratings very quickly and at low cost. Naturally, particularly outside France, it is possible to make use of any other equivalent communications network having similar capacities and features.

Further, since audience detection apparatuses do not provide voluminous amounts of information, it is possible for the central unit to receive the information provided by a large number of detection apparatuses over a very small number of TRANSPAC-type network lines to the central unit. For example, two network lines are sufficient for a population of about 500 detection apparatuses.

Preferably, the method also consists in recording in the memory of each detection apparatus the telephone number of an access point to the network and an access code to the central unit, and then in causing the detection apparatus to send said telephone number and said access code automatically at a determined time, said time being recorded in the memory of the apparatus, and after connection to the central unit and after information has been transmitted, in disconnecting the apparatus from the network in response to an instruction given by the central unit.

In this way, all of the apparatuses connect themselves to the central unit at a predetermined instant and transmit audience information to it in real time, and then remain connected thereto until they receive a disconnection instruction.

The transmission lines set up between the central unit and the detection apparatuses may also be used under central unit control: to modify an applications program loaded in the detection apparatus; and/or to modify parameters concerning the acquisition of information;

and/or to modify keywords, access codes, or the like which are also loaded in the apparatus; and indeed, it is possible to synchronize the internal clock of the apparatus with the clock of the central unit and possibly also to maintain the apparatus or to verify that it is operating properly.

According to another characteristic of the invention, the information provided by a detection apparatus includes information concerning the times at which its television set is switched on and off, the identity of the selected channel, and information about the number of people present in front of the television set. All of this information can be transmitted together to the central unit with a time delay relative to the corresponding event that is equal to a predetermined length of time.

Alternatively, successive transmission is used for the information about the selected channel and for the information about the number of people present in front of the television set, with transmission occurring at different lengths of time after the corresponding event.

This applies when the selected television channel can be identified and verified much more quickly than the number of people present in front of the television set. In this case, and in some applications, it may be advantageous to have information available very quickly and quasi-instantaneously concerning the selected television channel and the way channel selection varies over time, with the audience statistics thus established in quasi-real time being subsequently refined by taking account of the number of people present in front of each set.

The invention also provides a system for acquiring and transmitting information about television program audiences, the system comprising audience detection apparatuses associated with television sets and/or video recorders, a central unit for processing information provided by the apparatuses, and means for transmitting information between the apparatuses and the central unit via the telephone network, the system being characterized in that each apparatus includes a microprocessor and information storage memories, together with a modulator-demodulator circuit for connection to the switched telephone network, and in that the means for transmitting information comprise access points and lines in a digital network for conveying digital data, thereby constituting data concentrators and enabling a single digital network line to transmit in real time the information provided by a large number of audience detection apparatuses.

DESCRIPTION OF DRAWING

The invention will be better understood and other aims, characteristics, details, and advantages thereof will appear on reading the following description made by way of example and with reference to the sole figure of the accompanying drawing which is a block diagram of a portion of a system in accordance with the invention for acquiring and transmitting information.

The system essentially comprises audience detection or measurement apparatuses 10 located in the homes of selected "panelists" having at least one television set and possibly a video cassette record (VCR) and constituting a representative sample of the national population, thereby making it possible to sample the audience for various broadcast programs.

Each apparatus 10 is therefore associated with a television set 12 which may be connected to a VCR 14. Each apparatus 10 comprises a modulator-demodulator (modem) circuit 16 connected to the switched telephone network 22, a data processing unit 18 including a microprocessor and memory for storing information, and circuits 20 for acquiring information about whether the television set is on or off, about the selected channel and also about VCR operation, and preferably about the number of people present in front of the television set 12 for looking at a program. Naturally, the apparatus 10 may also include a clock, e.g. the clock of the data processing unit 18, thereby enabling the audience information acquired by the circuit 20 to be timed and dated accurately.

The apparatus 10 is connected to the switched telephone network 22 via a telephone line 24 of conventional type, but separate from the home telephone line of the panelist. A central unit 26, e.g. at a national level, is designed to be connected to various apparatuses 10 via a national data network 28 for conveying information in the form of packets, and referred to below as the TRANSPAC network in order to simplify the description. More precisely, access is obtained to the TRANSPAC network from the switched telephone network 22 via terminal concentrator points 30 associated with telephone numbers, e.g. short-code numbers. Once access to the TRANSPAC network has been obtained, it is necessary to send the name or the access code number of the computer system with which connection is required, i.e. in this case the central unit 26. When the connection between the unit 26 and an apparatus 10 is established, information can naturally travel in both directions over the telephone line 24, the switched network 22, the access point 30, and the corresponding line of the TRANSPAC network. This information may be sent from the central unit 26 to an apparatus 10, or else it may be sent from an apparatus 10 to the unit 26.

When the central unit 26 is to communicate with an apparatus 10, it calls it up over the switched telephone network by dialing the telephone number of the telephone line 24. On answering the call, the apparatus 10 connects itself to the central unit 26 via its modem 16, the line 24, an access point 30, and a TRANSP line. Once this connection has been set up, the central unit 26 can load a new applications program into the memory of the processor unit 18 in the apparatus 10, or set a specified time for automatic calling, or specify a telephone number, or load the memory of the unit 18 with parameters concerning the acquisition of audience information, or it can modify existing values of such parameters, or it can synchronize the clock of the apparatus 10 with that of the central unit 26, or, in conventional manner, it may access the memory of the unit 18 of the apparatus 10 and transfer the contents thereof to the central unit 26.

Alternatively, the processor unit 18 in the apparatus 10 may use the modem circuit 16 to call the central unit 26 at a predetermined (and programmed) time, by automatically dialing the number of an access point 30, and then sending the access code for the central unit 26. Once the connection is established, the central unit 26 can access the contents of the memory in the unit 18 and can therefore recover information recorded before the connection was set up, and it can remain connected to the apparatus 10 in order to receive in real time as it occurs the audience information provided by the apparatus about the on/off state of the television set 12, about the selected channel, about operation of the VCR, where appropriate, and about the number of people present in front of the television set.

The information collected by the apparatus 10 is generally verified or checked prior to being transmitted. For example, after changing channel, it is desirable to wait for a few seconds before transmitting that information in order to check that the channel is not changed again in the meantime. In practice, information about a change of channel is transmitted after a predetermined delay, e.g. lying in the range 2 seconds to 10 seconds, with the delay being modifiable at will. Information about the number of people present in front of the television set is transmitted after a longer delay, e.g. of the order of 10 seconds to 1 minute or 2 minutes, thereby enabling the information itself to be verified and also serving to take account of various transient situations that may exist, such as one person moving in front of another, etc. Although information about the selected channel and about the number of people present concerns a single event, all of said information is not simultaneously ready for transmission by the apparatus 10. It is therefore possible either to delay the information about the selected channel so that it matches the information about the number of people present with both types of information being transmitted simultaneously, e.g. with a known predetermined delay of 30 seconds, or else to transmit these two types of information one after the other, i.e. to transmit selected channel information as soon as it is available, followed by information about the number of people present once that becomes available. It may be advantageous to have information about the selected channel quasi-instantaneously in order to be able to give an initial trend very quickly on a national scale, and then to refine this estimate over the following 30 seconds to 1 minute.

The transmission of information between the apparatuses 10 and the central unit 26 requires a very small number of access lines between the TRANSPAC network and the central unit. Each of these lines may have a transmission capacity of 19,200 bauds, for example, which makes it possible, given the small volume of information transmitted in real time by each apparatus 10, for one line to handle the transmission of all of the information provided by about 250 apparatuses. Two lines would suffice for real time transmission of the information provided by 500 apparatuses connected simultaneously to the central unit 26.

Since the concentration and the regulation of the transmission of information between the apparatuses and the central unit are performed by the combination of the TRANSPAC network and its access points 30, the cost of installing a system in accordance with the invention is particularly low.

As mentioned above, the apparatuses disconnect themselves from the TRANSPAC network on receiving a special instruction which is transmitted by the central unit 26. The information collected by these apparatuses is then stored in the memories of their processor units 18 in order to be forwarded to the central unit 26 either in response to a call therefrom, or else automatically at the next programmed calling time for the apparatuses 10.

The direct connection lines using the switched telephone network between the central unit 26 and each of the apparatuses 10 are only used for the initial loading of an applications program in the memories of the units 18 in the apparatuses 10, or for modifying said program or parameters concerning the acquisition of information, and also for maintenance or verifying that the apparatuses 10 are operating properly.

We claim:

1. A system for acquiring and transmitting information about television program audiences, the system comprising:

a plurality of audience detection apparatuses, each associated with each of a plurality of television sets, each audience detection apparatus comprising data acquiring circuits, a microprocessor, information storage memories, a modem, means to store and retrieve a telephone number of a data concentrator and an access code to a central unit, means to automatically dial said telephone number and send said access code at a predetermined time recorded in the memory, and means to transmit the information provided by the audience detection apparatuses to the central unit while a television show is being viewed;

a plurality of data concentrators, each data concentrator being coupled to a plurality of modems of the audience detection apparatuses; and a digital network coupled to each data concentrator for transmitting information between the central unit and the data concentrators in packets while a television show is being viewed.

2. A system according to claim 1, wherein the system further comprises:

an internal clock within each audience detection apparatus;

a master clock associated with the central unit; and means to synchronize the internal clocks of the audience detection apparatuses with the master clock of the central unit.

3. A system according to claim 1, wherein the data acquiring circuits further comprise:

a means for detecting the on/off state of the associated television set;

a means for identifying the selected channel; and a means for determining the number of people present in front of the television set.

4. A system for acquiring and transmitting information about television program audiences, the system comprising:

a plurality of audience detection apparatuses each associated with each of a plurality of television sets;

each audience detection apparatus comprising data acquiring circuits, a microprocessor, information storage memories, a modem, means to store and retrieve a telephone number of a data concentrator and an access code to a central unit, means to automatically dial said telephone number and send said access code at a predetermined time recorded in the memory, and means to transmit the information provided by the audience detection apparatuses to the central unit while a television show is being viewed;

a plurality of data concentrators, each data concentrator being coupled to a plurality of modems of the audience detection apparatuses;

a digital network coupled to each data concentrator for transmitting information both ways between the central unit and the data concentrators in packets while a television show is being viewed; and means to control the amount of information transmitted in the packets thereby allowing a portion or all of the information stored in the memories of the audience detection apparatuses to be transmitted.

* * * * *